Sept. 19, 1961  R. A. E. WEISS  3,001,015
UNIDIRECTIONAL LIGHT TRANSMITTING SYSTEM FOR C.R.T. DISPLAYS
Filed April 30, 1959
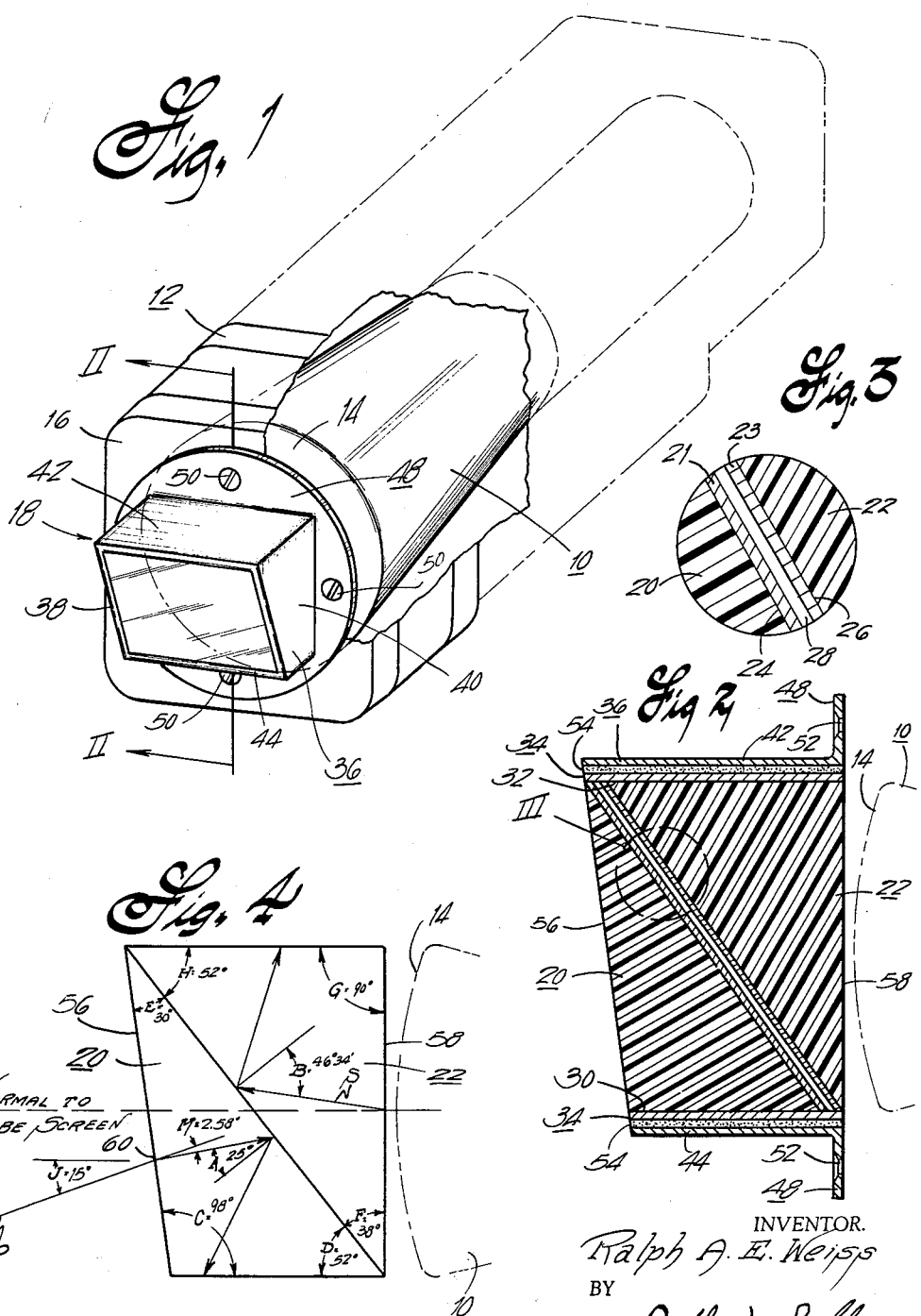
INVENTOR.
Ralph A. E. Weiss
BY
Arthur W. Collins
Attorney

United States Patent Office

3,001,015
Patented Sept. 19, 1961

3,001,015
UNIDIRECTIONAL LIGHT TRANSMITTING SYSTEM FOR C.R.T. DISPLAYS
Ralph A. E. Weiss, Glen Burnie, Md., assignor, by mesne assignments, to the United States of America as represented by the Secretary of the Navy
Filed Apr. 30, 1959, Ser. No. 810,199
3 Claims. (Cl. 178—7.85)

This invention relates to light shields and more particularly to light shields for the screen of a cathode ray tube or the like.

Heretofore, great difficulty has been experienced in designing a satisfactory light shield for excluding high intensity ambient light from the screen of a cathode ray tube or the like without excessive projections or attenuation of the screen display brightness. Light shields utilized in the past have taken a variety of forms but all of the shields have been found to be objectionable for one reason or another. Hoods which shade the tube screen from external or ambient light have been used in some instances but these have been found disadvantageous in that hoods by nature project-out in front of the cathode ray tube and thus sometimes take up needed space. The use of hoods has also been found in some applications to result in a safety hazard, especially in aircraft. Color selective filters have been used in some environmental applications but these too have been found to be objectionable because filters attenuate light passing through them and therefore limit the maximum available display brightness. Parallel slots of the Venetian-blind type have also been utilized in combination with a cathode ray tube but these have likewise been found to be objectionable since they obscure portions of the display if the display observer does not maintain a direct view between the slots.

The present invention contemplates an optical-type light shield which occupies a minimum of space in front of the screen of a cathode ray tube or the like and which also avoids excessive attenuation of the display brightness. The light shield has its inception in the well known and fundamental optical principle that light striking a junction of two optical media when attempting to pass from the more dense to the less dense media will be totally reflected if the angle of incidence is equal to or greater than the critical angle, the critical angle of course being defined as an angle whose sine is measured by the ratio of the index of refraction of the less dense material to the index of refraction of the more dense material.

In embodying this well known optical principle, the preferred embodiment of the invention is characterized by a pair of juxtaposed prisms having their opposing faces coated with materials of different indices of refraction and separated by an air gap. The top, bottom and side faces of the prisms are covered with a light absorbing medium and the two prisms are held in assembly and in close proximity to the screen of a cathode ray tube by a frame member or the like. The prisms are so constructed and the materials coating the opposing faces thereof are so selected that high ambient light striking one of the prisms in excess of a predetermined angle to the normal to the screen of the tube is reflected into the light absorbing medium carried on the prism faces to thereby establish a substantially undirectional transmission of light within the prisms from the screen display.

Accordingly, one object of the present invention is to permit an observer in a high ambient light situation to see a relatively low intensity display on the screen of a cathode ray tube or the like.

Another object of the invention is to provide a light shield for the screen of a cathode ray tube or the like which does not project excessively from the tube screen.

Another object of the invention is to shield the screen of a cathode ray tube or the like from high ambient light without excessive attenuation of the brightness of the screen display.

These and other objects of the present invention will become readily apparent to those skilled in the art from the following detailed description of the preferred embodiment thereof taken in connection with the accompanying drawings wherein:

FIG. 1 is a side elevation of a cathode ray tube and a light shield therefor embodying the present invention;

FIG. 2 is a section taken along the line II—II of FIG. 1;

FIG. 3 is an enlarged section of the construction shown within the circle III of FIG. 2; and FIG. 4 is a diagrammatic illustration of the preferred embodiment of the light shield.

Referring more particularly to FIG. 1, there is shown a cathode ray tube or the like 10 carried within a substantially rectangular-shaped housing or casing 12. Tube 10 is supported within housing 12 by any suitable means (not shown) and includes a front portion or screen 14 which may be viewed by an observer (not shown) from one end of the housing. To permit the observer to clearly see an image or display on the tube screen 14 in the presence of high intensity ambient light, the front wall 16 of the housing 10 carries the optical-type light shield of the present invention, generally designated by the reference numeral 18.

As best seen in FIGS. 2 and 3, the light shield 18 in this preferred embodiment of the invention is comprised of a pair of juxtaposed prisms 20 and 22 whose opposing faces 24 and 26, respectively, are spaced a predetermined distance apart and separated by an air gap 28. The two prisms 20 and 22 are preferably made of Plexiglas although any other suitable material such as crown glass or the like having the desired optical properties may be successfully employed. Both Plexiglas and crown glass are especially desirable from an optical standpoint inasmuch as it is well known that light passing through these materials into air will undergo a relatively low attenuation. For example, light striking a Plexiglas to air junction or passing from Plexiglas to air will be attenuated no more than 6%.

The opposing faces 24 and 26 of the two prisms each carry an optical medium for establishing or defining a critical angle with respect to light passing through the two prisms into the air gap 28. Prism 20 in this preferred embodiment of the invention is covered with a thin coating 21 of zinc sulphide and prism 22 is correspondingly covered with a thin coating 23 of magnesium fluoride. The thickness of the coatings of the two materials is not critical although it has been found that the thickness of the material will have a marked effect on the attenuation of the light passing therethrough. To avoid excessive attenuation of the transmitted light, it has been found desirable to vacuum deposit the two optical media to insure the application of a substantially uniform and relatively thin film. While zinc sulphide and magnesium fluoride have been utilized as the preferred optical media, it will be apparent to those skilled in the art that any other suitable medium or media or combinations thereof having the desired optical properties and capable of being applied to the opposing faces of prisms in the form of a thin film may be successfully employed. Zinc sulphide and magnesium fluoride were specifically selected for use in the preferred embodiment of the invention because of the range of light exclusion afforded thereby, as will be discussed more in detail hereinafter in connection with the function and operation of the light shield.

The bottom face 30 of prism 20 and the top face 32 of prism 22 together with the end faces (not shown) of both prisms carry a light absorbing means or medium 34 for absorbing light that is reflected thereinto. Any suitable light absorbing medium such as a black paint or the like that will readily adhere to the external surfaces or faces of the prisms may be successfully employed. The light absorbing medium 34 utilized in this particular instance takes the form of a black paint which is specifically comprised of Rohm and Haas PS–18 Component A (a well known and commercially available product) reduced to 30% polymer with 5% boneblack added as pigment. This particular paint has been found to provide a particularly effective light absorbing medium when used in combination with Plexiglas. It may be applied to the light absorbing surfaces of the Plexiglas prisms by any suitable means or method although it is preferable to apply the paint with a brush and thereafter bake the painted prisms for a predetermined time at a temperature of approximately 65° C. to insure complete polymerization.

Prisms 20 and 22 are held in assembly and supported in close proximity to the tube screen 14 by a frame means or frame 36 which completely surrounds the light absorbing surfaces of the two prisms. The frame 36 is generally rectangular in shape and is comprised of a pair of opposed end members 38 and 40 in combination with top and bottom members 42 and 44, respectively, the various members of the frame 36 being formed in this particular instance as an integral unit. The frame 36 is carried by an annular plate 48 which in turn is secured to the front wall 16 of housing 12 to thereby support this frame 36 on the open end of the housing in direct alignment with and in close proximity to the screen 14 of the cathode ray tube 10. Annular plate 48 is attached to the housing wall 16 by a plurality of screws or the like 50 (only three shown) and in this particular embodiment of the invention is integrally formed with the frame 36 although it will be appreciated that the frame 36 and plate 48 could be made as separate components and thereafter connected or held in assembled engagement by any suitable means such as soldering, welding or brazing. Annular plate 48 is provided with a plurality of countersunk holes or passages 52 therein (FIG. 2) to receive the screws 50.

Prisms 20 and 22 are retained in their juxtaposed position within frame 36 by separately and individually securing each prism to the frame. The prisms are preferably retained in assembly by securing the light absorbing surfaces of the prisms to the inner peripheral surfaces of the frame by means of an adhesive 54 which in this preferred embodiment of the invention takes the form of a commercially available cement known as Rohm and Haas PS–18. Any other suitable type of adhesive may be employed although it will be appreciated that the adhesive utilized should be compatible with the light absorbing medium carried on the prism faces. It will also be apparent that any suitable type of connection or securing means other than an adhesive may be successfully employed to connect the prisms to the frame.

The function and operation of the light shield 18 can best be explained with reference to the schematic illustration of FIG. 4 wherein the critical angles defined by the optical media 21 and 23 carried on the opposing faces of prisms 20 and 22 are designated as angles A and B, respectively. To determine the magnitude of the critical angles, let it first be assumed that ambient light is falling upon or striking the front face 56 of prism 20 and that light from the screen display is falling upon or striking the rear face 58 of prism 22. A ray of ambient light R striking face 56 of prism 20 at point 60 and at a predetermined angle J to the normal to the tube screen 14 will be refracted a predetermined angle M in passing through the prism. After passing through the prism 20, the ambient light ray R will then pass through the junction of the Plexiglas and the zinc sulphide optical medium 21 carried on face 24 of prism 20. After passing through this junction, light ray R will then pass through the zinc sulphide film 21 and encounter the zinc sulphide to air junction in the air gap 28.

At this latter junction of two optical media, zinc sulphide to air, the light ray R in attempting to pass through the junction and in passing from a more dense media (zinc sulphide, index of refraction $N=2.4$) into a less dense media (air, index of refraction $N=1$) will be totally reflected into the light absorbing means 34 carried by the prisms if the light ray R strikes this junction with an angle of incidence which is equal to or greater than the critical angle A which may be defined and predetermined by the following relationship:

$$\text{Sine critical angle } A = \frac{N \text{ of less dense material}}{N \text{ of more dense material}}$$

$$= \frac{N \text{ of air}}{N \text{ of zinc sulphide}} = \frac{1}{2.4}$$

Therefore: Critical angle $A = $ arc sine $1/2.4 = 25°$.

Thus, it can readily be seen that any ambient light passing through prism 20 and striking the junction of the zinc sulphide and air at an incidence angle of less than 25° will pass through this junction and thereafter pass through the rear prism 22 to strike the tube screen 14.

A light ray S emanating from the display on the tube screen 14 will correspondingly encounter the critical angle B when attempting to pass through the optical medium 23 (magnesium fluoride, index of refraction $N=1.33$) carried on face 26 of prism 22 and enter the air gap 28. When display light ray S attempts to penetrate the magnesium fluoride to air junction, the critical angle B thus encountered may be defined and predetermined in accordance with the following relationship:

$$\text{Critical angle } B = \frac{N \text{ of less dense material}}{N \text{ of more dense material}}$$

$$= \frac{N \text{ of air}}{N \text{ of magnesium fluoride}} = \frac{1}{1.33}$$

Therefore: Critical angle $B = $ arc sine $1/1.33 = 46°34'$.

Thus, it can also readily be seen that any light emanating from the screen display and attempting to pass through the magnesium fluoride to air junction will be totally reflected into the light absorbing surfaces of the prisms 20 and 22 if the light strikes this junction at an incidence angle of 46°34′ or greater. Conversely, any screen display light that strikes the magnesium fluoride to air junction with an incidence angle of less than 46°34′ will of course pass through the junction and thereafter pass through the front prism 20 where it can be seen by an observer.

To determine the shape or configuration of the two prisms 20 and 22 in any given environmental application of the light shield, with critical angles A and B known or predetermined, it merely becomes a matter of arbitrarily selecting the incident angle of the ambient light to be reflected into the light absorbing surfaces on the prisms and selecting the highest angle at which the screen display must be viewed by an observer. Having determined the angle of transmission of the screen display and the angle of rejection of the ambient light, the angular configurations of the two prisms will then be obvious.

In the preferred embodiment of the invention (FIG. 4), it was desired to reject ambient light striking the front face 56 of prism 20 at an angle of $-15°$ or less (angle J) to the normal to the tube screen. Knowing that ambient light passing through prism 20 will be refracted by angle M, which in Plexiglas is 2.58°, and knowing that critical angle A is 25°, angles C, D and E must then be selected so that ambient light striking the front face 56 of prism 20 at angles of $-15°$ or less will after passing through the prism strike the zinc sulphide to air junction with an angle of incidence in excess of critical angle A. In the preferred embodiment of the invention, angles of $C=98°$, $D=58°$ and $E=30°$ were found to provide the exclusion of ambient light within the desired range. Correspondingly, the rear prism or prism 22 was constructed with angles $F=38°$, $G=90°$ and $H=52°$.

In reduction to practice, the light shield of the present invention has been found to be extremely small and compact. Light shields constructed in accordance with the preferred embodiment of the invention have been found to have a maximum thickness (top face 32 of the prisms) or maximum projection from the tube screen of 2.831" together with a width of 3.625" (length of rear prism face 58) and a length of 4.000". Plexiglas has been utilized as the preferred prism material in the reduction to practice not only because of its relatively low weight but also because of the fact that it attenuates the display brightness no more than 6%, as was hereinbefore mentioned.

It is also noteworthy to mention that in this preferred embodiment of the invention, the front face 56 of prism 20 is canted or tilted. This tilted face construction has been found to be advantageous in that the tilted face 56 will reflect objects from a less intensely lighted area and thus prevent these objects from appearing on the front face of the light shield where they would interfere with or be superimposed upon the screen display. It will also be appreciated that the second or rear prism 22 serves a dual function in that it serves to correct or minimize the distortion which the front prism 20 would introduce if used alone.

Obviously many modifications and variations of the present invention are possible in the light of the above teachings. It is therefore to be understood that within the scope of the appended claims the invention may be practiced otherwise than as specifically described.

What is claimed is:

1. In combination with a cathode ray tube having a viewing screen from which image light emanates, a light shielding device for limiting the degrading effects of ambient light on such image, which device comprises a first prism; a second prism; first optical means carried on one face of said first prism having an index of refraction greater than one; second optical means carried on one face of said second prism having an index of refraction greater than one and differing from the index of refraction of the said first optical means; light absorbing means carried on other faces of said first and second prisms; mounting means for holding the said prisms in a juxtaposed position whereby the faces of the prisms carrying the optical means are opposite to each other and separated by an air gap, the means mounting said prisms being so constructed and arranged that said optical means on the face of the said first prism define a critical angle whereby ambient light striking said first prism in excess of a predetermined angle to the normal to said cathode tube screen will be reflected into said light absorbing means and that said optical means on said opposing face of said second prism defines a critical angle whereby light from a display on said tube screen striking said second prism in excess of a predetermined angle will be reflected into said light absorbing means; and means connected to said mounting means for securing said prisms in assembly in close proximity to the screen of said cathode ray tube.

2. In the combination of claim 1 wherein said prisms are made of Plexiglas.

3. In the combination of claim 1 wherein said optical means carried on the opposing face of said first prism is comprised of zinc sulphide and wherein the optical means carried on the opposing face of said second prism is comprised of magnesium fluoride.

References Cited in the file of this patent

UNITED STATES PATENTS

| | | |
|---|---|---|
| 2,388,203 | Zindel | Oct. 30, 1943 |
| 2,550,962 | Brandon | May 1, 1951 |
| 2,731,872 | Schwede | Jan. 24, 1956 |
| 2,754,718 | Rock | July 17, 1956 |
| 2,773,411 | Schwede | Dec. 11, 1956 |
| 2,942,254 | Beers | June 21, 1960 |